United States Patent
Jacobs et al.

(10) Patent No.: US 6,580,309 B2
(45) Date of Patent: Jun. 17, 2003

(54) SUPPLY ASSEMBLY FOR A LED LIGHTING MODULE

(75) Inventors: Ronny Andreas Antonius Maria Jacobs, Eindhoven (NL); Bertrand Johan Edward Hontele, Eindhoven (NL); Antonius Adrianus Maria Marinus, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/773,159

(22) Filed: Jan. 31, 2001

(65) Prior Publication Data

US 2001/0024112 A1 Sep. 27, 2001

(30) Foreign Application Priority Data

Feb. 3, 2000 (EP) .............................................. 00200370

(51) Int. Cl.[7] .......................... H01L 31/00; H01K 3/42; H01K 17/78
(52) U.S. Cl. ........................................ 327/514; 327/108
(58) Field of Search .............................. 327/108, 530, 327/538, 514, 515

(56) References Cited

U.S. PATENT DOCUMENTS

| | | | |
|---|---|---|---|
| 4,982,203 A | * 1/1991 | Uebbing et al. ............. 347/236 |
| 5,514,989 A | * 5/1996 | Sato et al. .................... 327/109 |
| 5,661,645 A | 8/1997 | Hochstein ...................... 363/89 |
| 5,889,583 A | * 3/1999 | Dunne ......................... 365/5.01 |
| 5,912,568 A | 6/1999 | Kiley ........................... 327/108 |
| 6,057,675 A | * 5/2000 | Tateishi ........................ 323/225 |
| 6,095,661 A | * 8/2000 | Lebens et al. ................ 315/224 |
| 6,166,528 A | * 12/2000 | Rossetti et al. .............. 323/283 |
| 6,239,716 B1 | * 5/2001 | Pross et al. ................ 315/200 A |
| 6,281,991 B1 | * 8/2001 | Mori et al. ................... 358/471 |

FOREIGN PATENT DOCUMENTS

DE  19732828  2/1999  ............ G09G/3/14

OTHER PUBLICATIONS

"Compact Front Lighting for Reflective Display", SID 96 Applications Digest, pp. 43–46.

* cited by examiner

Primary Examiner—Terry D. Cunningham
Assistant Examiner—Quan Tra

(57) ABSTRACT

A supply assembly for a LED lighting module, comprising a supply unit to which the LED lighting module can be connected and a burst control unit which is capable of switching the power supply unit on and off with a burst frequency (fburst) so as to control the mean light output. Preferably, the burst control unit is provided with a pulse duration modulator for controlling the pulse length (T pulse) during which the supply unit is operative.

8 Claims, 2 Drawing Sheets

SUPPLY ASSEMBLY FOR A LED LIGHTING MODULE

BACKGROUND OF THE INVENTION

This invention relates to a supply assembly for a LED lighting module, comprising a supply unit to which the LED lighting module can be connected and a burst control unit which is capable of switching the power supply (the voltage or the current) to the LED lighting module on and off with a burst frequency so as to control the mean light output of the LED lighting module.

LED lighting modules are being used more and more to illuminate objects. They are also used as signal lighting, for example, in traffic lights. The light output of a LED lighting module can be controlled in various well-known ways. One of said ways consists in controlling (dimming) the current intensity through the LED module. This has the drawback that at a current intensity below approximately 20% of the nominal current intensity, the relation between the current intensity and the light output becomes very non-linear, and the efficiency of the module becomes far from optimal. Therefore, solutions have been sought which enable the light intensity to be controlled while the nominal current intensity through the module is maintained. U.S. Pat. No. 5,661,645 describes a supply unit for a LED lighting module as described in the opening paragraph. In said document, the burst control unit is arranged between an output of a voltage source and the LED lighting module, so that the power supply to the LED lighting module can be switched on and off with a certain burst frequency. The voltage source is continuously in the on-state even when the power supply to the LED lighting module is cut off, which results in an unnecessary loss of energy.

SUMMARY OF THE INVENTION

It is an object of the invention to provide an efficient, reliable, inexpensive and simple supply assembly for a LED lighting module with an improved efficacy.

This is achieved in accordance with the invention in that the burst control unit is capable of switching the power supply unit on and off with the burst frequency. In this case, the supply unit is in the on-state only when current is actually being supplied, so that the generation of heat and energy losses are minimized, resulting in an improved efficacy of the system.

Preferably, the burst control unit comprises a pulse-duration modulator which is capable of controlling the length of the pulses during which the supply unit is in the on-state. This enables the mean light output to be controlled.

Preferably, the supply unit is a controlled constant-current source. This has the advantage that further measures in the LED module, such as the provision of additional resistors, are not necessary to control the electric current through the LEDs.

Preferably, the supply unit is a high-frequency switch mode power supply (smps) which supplies a ripple DC current or a ripple DC voltage, said supply unit preferably comprising a half-bridge converter, a buck converter or a flyback converter. The pulse duration modulator can preferably switch the converter on and off with the burst frequency. In this way, the desired effect can be achieved very efficiently. In addition, preferably the ripple frequency of the converter is an integer multiple of the burst frequency, and the ripple DC voltage or ripple DC current can be synchronized with the burst control signal, resulting in a reduction of any stability problems and loss of energy in the system.

For the same reason, the burst frequency preferably is an integer multiple of the frequency (customarily 50 Hz or 60 Hz) of the voltage source, for example the mains voltage to which the supply assembly can be connected, and the burst control signal is synchronized with the mains voltage signal.

Preferably, the burst frequency lies in the range between 50 and 200 Hz or above 20 kHz; more preferably the burst frequency is 100 Hz (if the mains frequency is 50 Hz) or 120 Hz (if the mains frequency is 60 Hz). When use is made of a half-bridge converter, it is best if the burst frequency is chosen as low as possible in connection with switching losses. However, the frequency should preferably exceed the frequency that can be observed by the human eye (approximately 70 Hz), because at a lower frequency the flicker produced by the LEDs is noticeable, which is annoying. In addition, the frequency should preferably be outside the human range of hearing of 200 Hz to 20 kHz to preclude disturbing sound effects.

Preferably, the current supplied by the supply unit in the on-state to the LED lighting module is a constant current which has been chosen as a nominal current, and which results in an optimum light output of the LED lighting module, so that the supply unit can be optimized for the nominal current intensity, which has a favorable effect on the efficacy.

In a preferred embodiment, the burst control unit is coupled to a sensor which is capable of measuring the temperature and/or the light output of the LED lighting module, said burst control unit being capable of controlling the length of the pulses during which the supply unit is in the on-state in dependence upon the value measured by the sensor. By virtue thereof, the light output of the module can be stabilized under varying conditions. In a further preferred embodiment, the duration of the pulses can be adjusted by a user. By virtue thereof, the light output of the module can be dimmed in accordance with the user's needs.

The supply assembly as herein disclosed is also suitable to operate a LED lighting module which forms part of a display unit, for instance a liquid crystal display (LCD).

BRIEF DESCRIPTION OF THE DRAWING

These and other aspects of the invention will be apparent from and elucidated with reference to the embodiments described hereinafter.

DESCRIPTION OF THE PREFERRED EMBODIMENTS

Figure 1:
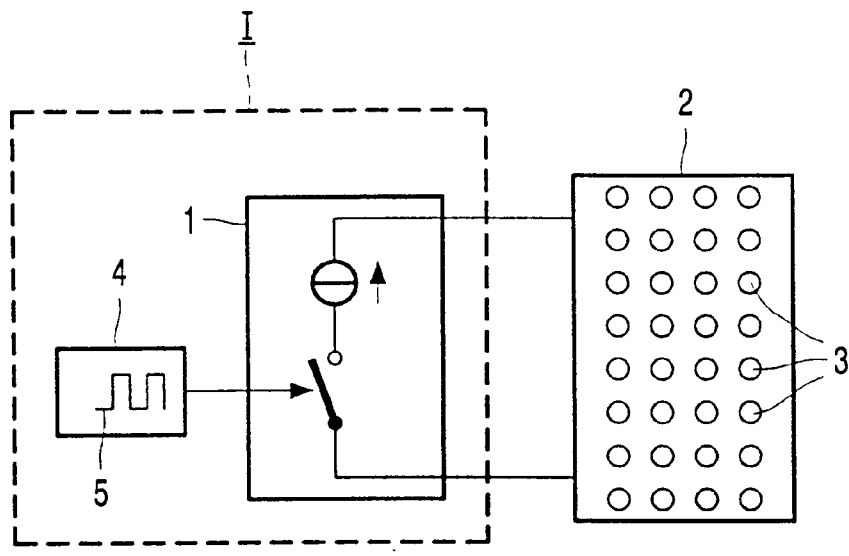
FIG. 1 diagrammatically shows a supply assembly to which a LED lighting module is connected.
Figure 2:
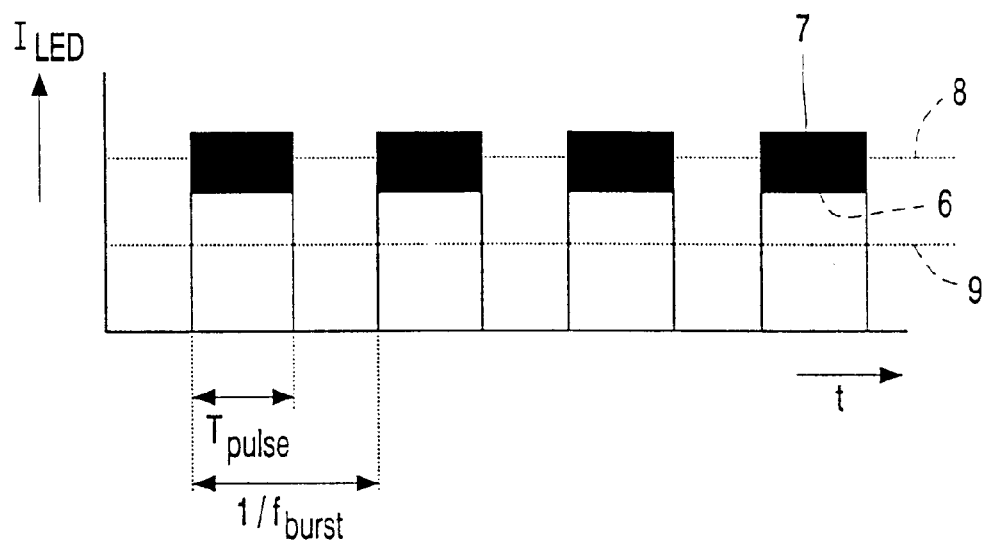
FIG. 2 shows a graph wherein the current through the LED lighting module is shown as a function of time.

As shown in FIG. 1, a supply assembly I comprises a supply unit, preferably a controlled constant-current source 1, which supplies current to a LED lighting module 2. The LED lighting module 2, for instance as backlight for a LCD, comprises a number of light-emitting diodes (LEDs) 3, which may be parallel-connected or series-connected. The figure diagrammatically shows that a burst control unit 4 is capable of switching the controlled constant-current source 1 on and off. For this purpose, the burst control unit 4 emits a burst control signal 5 which is composed of pulses having a duration Tpulse which switch on the controlled constant-current source 1 with a burst frequency (fburst), as shown in FIG. 2. The burst frequency (fburst) should exceed the frequency that can be observed by the human eye (approximately 70 Hz) because at a lower frequency the flicker produced by the LED lighting module would be very disturbing (cf the monitor of a display tube). However, the burst frequency fburst should not exceed a certain value because this would lead to an unnecessary amount of switching losses and, in addition, might cause undesirable, audible background noises.

In this example, the controlled constant-current source 1 is a high-frequency switch mode power supply (smps) comprising a half-bridge converter, which half-bridge converter can be switched on and off by the burst control unit. Other high-frequency converters, such as a buck converter, a flyback converter and other types of converters can also suitably be used as a controlled constant-current source. Such a known controlled constant-current source delivers direct current, the current intensity and/or the voltage of which can be controlled. The distinctive feature of such a controlled constant-current source is that the direct current is a ripple direct current, which means that the current intensity varies with a high ripple frequency between a minimum value 6 and a maximum value 7. The mean of this minimum value 6 and maximum value 7 is the mean direct-current intensity 8 of the controlled constant-current source 1. This current intensity 8 is preferably equal to the current chosen as the nominal current for the LED lighting module 2. The ripple signal of the controlled constant-current source 1 is preferably synchronized with the burst control signal in order to preclude additional switching losses.

FIG. 2 shows the situation wherein the mean amplitude of the current 9 through the LED lighting module 2 is set at 50% of the mean current 8 of the controlled constant-current source. This is achieved by setting the pulse duration Tpulse at 50% of the cycle length (fburst). By varying the pulse duration Tpulse, the mean amplitude of the current 9 through the LED lighting module 2 can obtain any desired value between 0% and 100% of the nominal current delivered by the controlled constant-current source 1. To this end the burst control unit 4 is provided with a pulse duration modulator.

Figure 3:
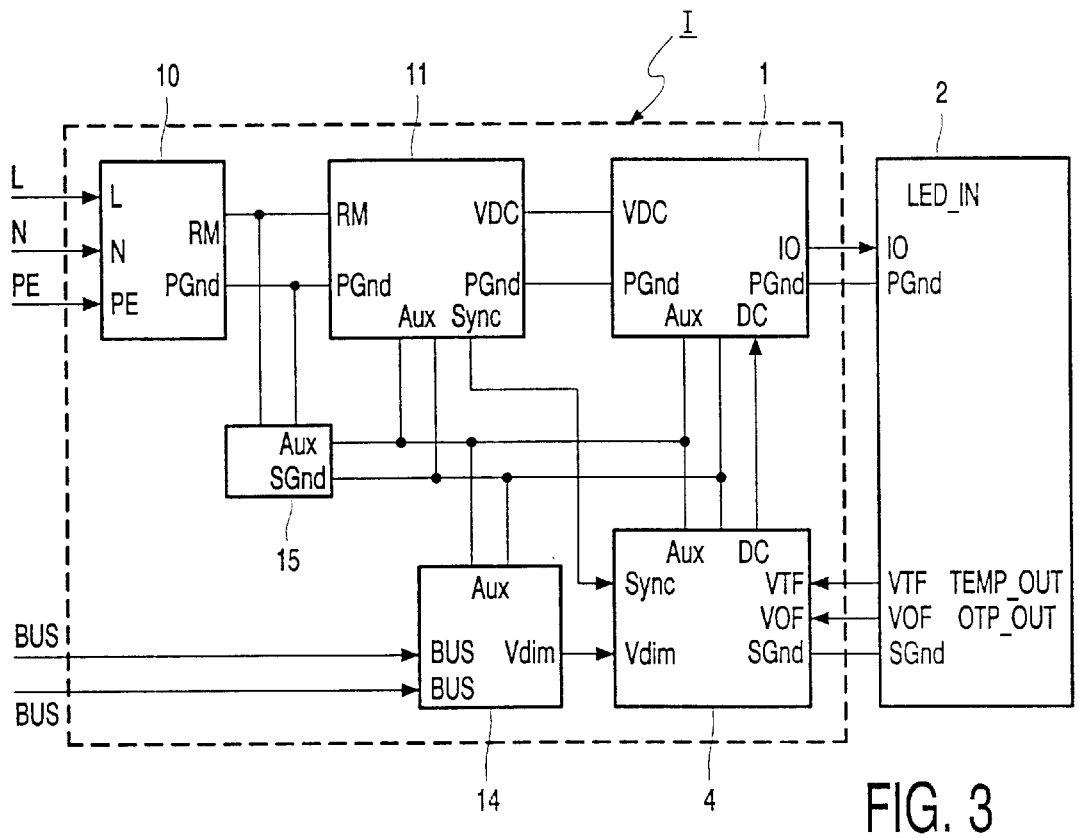
FIG. 3 shows a first detailed example of the system shown in FIG. 1.
Figure 4:
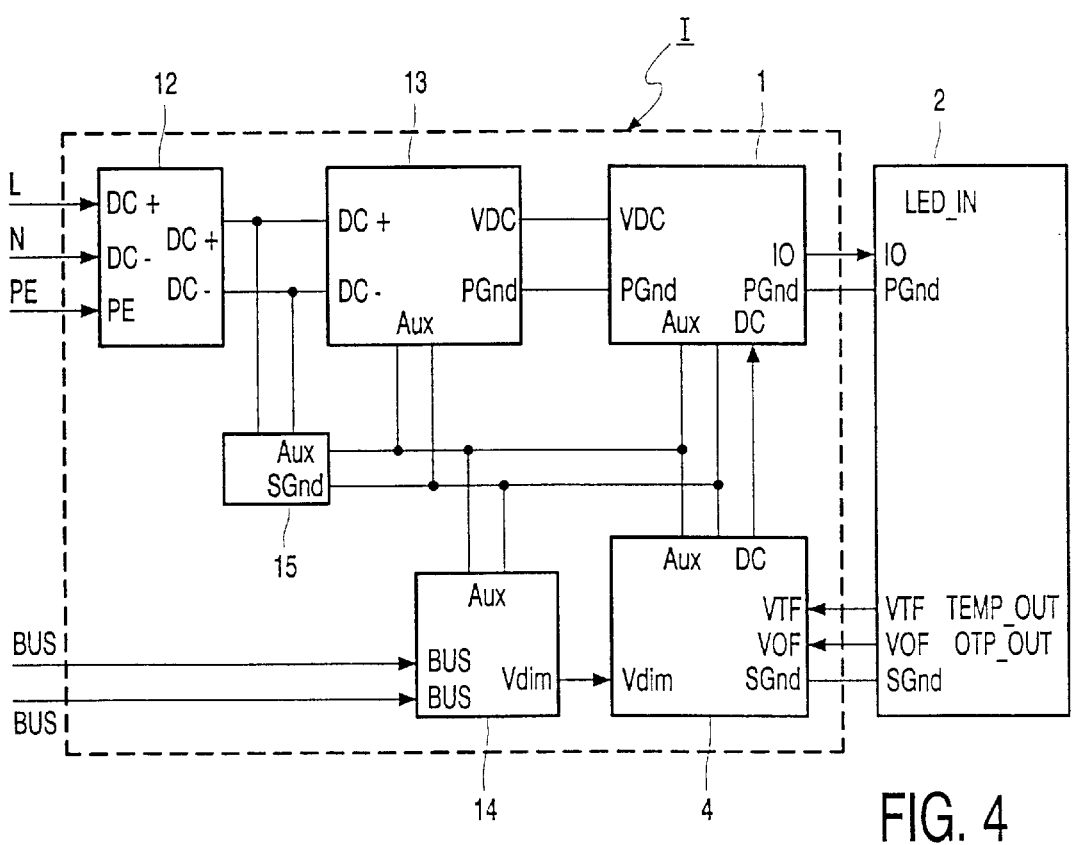
FIG. 4 shows a second detailed example of the system shown in FIG. 1.

FIGS. 3 and 4 show preferred embodiments of a supply assembly I, the supply assembly I as shown in FIG. 3 being connectable to an AC voltage source, such as the mains, and the supply assembly I as shown in FIG. 4 being connectable to a DC voltage source, such as a battery. In common with FIG. 1, the high-frequency switch mode power supply shown in FIGS. 3 and 4 comprises a controlled constant-current source (Switch mode current source) 1, the LED lighting module (LED MODULE) 2 and the burst control unit (Burst control) 4.

The burst control unit 4 may be connected to a dimming device (Dim interface) 14 which can be set by a user via a bus (Bus). The dimming device is capable of controlling the pulse duration (also referred to as pulse width) Tpulse of the burst control unit 4 by means of a voltage signal (Vdim).

As the light output of LEDs is temperature-dependent, the LED lighting unit 2 may be provided with sensors which observe the temperature (TEMP_OUT) and/or the light output (OPT_OUT) of the LED lighting unit 2. The sensors can send a voltage signal (VTF and VOF, respectively) to the burst control unit 4, said voltage signals also being capable of controlling the pulse duration Tpulse. By means of this feedback the light output of the LED lighting module 2 can be efficiently stabilized.

In accordance with FIG. 3, the controlled constant-current source 1 is fed, in a manner which is known per se, by a filter/rectifier (Filter/rect.) 10 and a preconditioning device (Preconditioner) 11, which are connected to, for example, a grounded electric mains (110V/60 Hz or 230V/50 Hz) with terminals L, N and PE. In the case of low-power systems (<25W), the preconditioning device can be replaced by a simple energy buffer. To preclude any problems regarding the stability of the preconditioning device, it is important to synchronize the burst control signal with the mains voltage signal by means of a synchronization signal (Sync). Auxiliary supply (Aux. supply) 15 provides the different parts of the system with the necessary low-voltage supply.

In accordance with FIG. 4, the controlled constant-current source 1 is fed by a DC filter (Filter) 12, and optionally a DC/DC converter (DC-DC converter) 13, which are connected to a storage cell or a battery having terminals L and N.

What is claimed is:

1. A supply assembly for a LED lighting module, comprising: a power supply unit, including a converter which supplies a ripple DC current or a ripple DC voltage, means for coupling the LED lighting module to the power supply unit, and a burst control unit which produces signal pulses for switching the power supply unit on and off with a burst frequency (fburst) so as to control the mean light output of the LED lighting module, characterized in that the converter has a ripple frequency which is an integer multiple of the burst frequency (fburst), and the ripple DC voltage or ripple DC current is synchronized with the signal pulses of the burst control unit.

2. A supply assembly as claimed in claim 1, further comprising: means for coupling the supply assembly to an AC mains voltage, wherein the burst frequency (fburst) is an integer multiple of the frequency of the AC mains voltage, and means for synchronizing the burst control signal pulses of the burst control unit with the mains voltage.

3. A supply assembly for a LED lighting module, comprising: a supply unit coupled to a source of supply voltage, means for coupling the LED lighting module to the supply unit, and a burst control unit, which operates independently of the source of supply voltage, for switching the power supply to the LED lighting module on and off with a burst frequency (fburst) so as to control the mean light output of the LED lighting module, characterized in that the burst control unit produces pulses and comprises a pulse-duration modulator which controls the length (Tpulse) of the pulses during which the supply unit is in the on-state, and the burst control unit switches the supply unit on and off with the burst frequency (fburst)

wherein the pulse-duration modulator switches a converter of the supply unit on and off at the burst frequency (fburst), and the converter has a ripple DC voltage or ripple DC current at a ripple frequency which is an integer multiple of the burst frequency (fburst), the supply assembly further comprising;

means for synchronizing the ripple DC voltage or ripple DC current with a burst control signal of the burst control unit.

4. A supply assembly for a LED lighting module, comprising: a supply unit, means for coupling the LED lighting module to the supply unit, and a burst control unit for switching the supply unit on and off with a burst frequency (fburst) so as to control the mean light output of the LED lighting module, and further comprising:

means for coupling the supply assembly to an AC mains voltage, wherein the burst frequency is an integer multiple of the frequency of the AC mains voltage, and means for synchronizing a burst control signal of the burst control unit with the mains voltage.

5. A supply assembly as claimed in claim 4 wherein the burst frequency (fburst) lies in the range between 50 Hz and 200 Hz or above 20 kHz.

6. A supply assembly as claimed in claim 4 wherein a current (ILED) supplied to the LED lighting module by the supply unit in the on-state is a nominal constant current which results in an optimum light of the LED lighting module.

7. A supply assembly as claimed in claim 4 further comprising: means for controlling operation of the burst control unit as a function of the light output or temperature of the LED lighting module.

8. A supply assembly as claimed in claim 1 wherein the burst control unit comprises a pulse-duration modulator which controls the on and off time of the supply unit.

* * * * *